United States Patent
Wada et al.

(10) Patent No.: US 12,073,572 B2
(45) Date of Patent: Aug. 27, 2024

(54) IMAGE PROCESSING DEVICE, DISPLAY CONTROL METHOD, AND RECORDING MEDIUM

(71) Applicant: Konica Minolta, Inc., Tokyo (JP)

(72) Inventors: Hisashi Wada, Tokyo (JP); Tomoaki Takemura, Hachioji (JP); Hidekazu Takahashi, Toyonaka (JP); Ryuta Ogawa, Suita (JP); Sumiya Nagatsuka, Hino (JP); Ikki Nakamura, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 74 days.

(21) Appl. No.: 17/887,612

(22) Filed: Aug. 15, 2022

(65) Prior Publication Data

US 2023/0052910 A1 Feb. 16, 2023

(30) Foreign Application Priority Data

Aug. 16, 2021 (JP) ................. 2021-132295

(51) Int. Cl.
  *G06T 7/246* (2017.01)
  *G06T 7/00* (2017.01)
  *G06T 7/33* (2017.01)
  *G06T 11/20* (2006.01)

(52) U.S. Cl.
  CPC .............. *G06T 7/33* (2017.01); *G06T 7/0012* (2013.01); *G06T 7/246* (2017.01); *G06T 11/203* (2013.01); *G06T 2207/30004* (2013.01)

(58) Field of Classification Search
  CPC ......... G06T 7/33; G06T 7/246; G06T 7/0012; G06T 11/203; G06T 2207/30004; G06T 2207/30008; G06T 2207/30012; G06T 2207/10072; G06T 2207/10116
  See application file for complete search history.

(56) References Cited

U.S. PATENT DOCUMENTS

| | | | |
|---|---|---|---|
| 2013/0156267 A1* | 6/2013 | Muraoka | A61B 6/5217 382/103 |
| 2016/0331281 A1* | 11/2016 | Lavoie | A61B 8/0841 |
| 2017/0278239 A1* | 9/2017 | Fujiwara | G06T 7/0016 |
| 2019/0102893 A1* | 4/2019 | Noji | G06T 7/11 |

FOREIGN PATENT DOCUMENTS

| | | |
|---|---|---|
| JP | 2020089612 A | 6/2020 |
| JP | 2021058570 A | 4/2021 |

* cited by examiner

*Primary Examiner* — Antonio A Caschera
(74) *Attorney, Agent, or Firm* — CANTOR COLBURN LLP (57) ABSTRACT

An image processing device includes a hardware processor. The hardware processor designates, from one frame image of a dynamic image acquired by dynamic imaging of a movement of a locomotorium, a plurality of regions or points on a structure included in the locomotorium, sets an alignment reference based on the designated regions or points, tracks the designated regions or points in a plurality of frame images of the dynamic image, aligns a line segment connecting the regions or the points to each other in the plurality of frame images based on the alignment reference, and causes a display to display the line segment so as to be superimposed on a representative frame image of the dynamic image.

6 Claims, 9 Drawing Sheets

IMAGE PROCESSING DEVICE, DISPLAY CONTROL METHOD, AND RECORDING MEDIUM

CROSS-REFERENCE TO RELATED APPLICATIONS

The present invention claims priority under 35 U.S.C. § 119 to Japanese Patent Application No. 2021-132295 filed on Aug. 16, 2021, the entire contents of which being incorporated herein by reference.

BACKGROUND

Technological Field

The present invention relates to an image processing device, a display control method, and a recording medium.

Description of the Related Art

A technique for displaying a dynamic image obtained by imaging the movement of a subject so that a doctor or the like can easily make a diagnosis has been proposed.

For example, JP 2020-89612 A describes a technique for extracting the diaphragm from each of a plurality of medical images obtained by continuously radiographing the chest along the time axis and superimposing the extracted diaphragm on the selected one medical image to generate a display image.

In addition, JP 2021-58570 A describes a technique for setting a region of interest on the bone or joint of a radiographic dynamic image of a subject including a plurality of bones, tracking the set region of interest in each frame image of the radiographic dynamic image, and aligning a plurality of frame images with the tracked region of interest as a reference.

SUMMARY

However, in the dynamic image obtained by imaging the movement of a locomotorium such as bones and joints, even a structure around a structure to be observed moves. For this reason, even if the display technique described in JP 2020-89612 A is applied as it is, it is difficult to correctly grasp the movement of the observation target.

In addition, when the dynamic image is displayed by aligning the frame images with the bones, joints, and the like serving as fulcrums as a reference as in the technique described in JP 2021-58570 A, the movement of the observation target can be displayed in an easy-to-understand state, but it is difficult to accurately grasp the movement of the observation target between the frame images.

An object of the invention is to make it possible to accurately grasp the movement of a structure from a dynamic image obtained by imaging the movement of a locomotorium.

To achieve at least one of the above-mentioned objections, according to an aspect of the present invention, an image processing device reflecting one aspect of the present invention includes a hardware processor. The hardware processor designates, from one frame image of a dynamic image acquired by dynamic imaging of a movement of a locomotorium, a plurality of regions or points on a structure included in the locomotorium, sets an alignment reference based on the designated regions or points, tracks the designated regions or points in a plurality of frame images of the dynamic image, aligns a line segment connecting the regions or the points to each other in the plurality of frame images based on the alignment reference, and causes a display to display the line segment so as to be superimposed on a representative frame image of the dynamic image.

According to another aspect, a display control method includes: designating, from one frame image of a dynamic image acquired by dynamic imaging of a movement of a locomotorium, a plurality of regions or points on a structure included in the locomotorium; setting an alignment reference based on the designated regions or points; and tracking the designated regions or points in a plurality of frame images of the dynamic image, aligning a line segment connecting the regions or the points to each other in the plurality of frame images based on the alignment reference, and causing a display to display the line segment so as to be superimposed on a representative frame image of the dynamic image.

According to another aspect, a non-transitory recording medium storing a computer readable program causing a computer to function as: a designator that designates, from one frame image of a dynamic image acquired by dynamic imaging of a movement of a locomotorium, a plurality of regions or points on a structure included in the locomotorium; a setter that sets an alignment reference based on the designated regions or points; and a controller that tracks the designated regions or points in a plurality of frame images of the dynamic image, aligns a line segment connecting the regions or the points to each other in the plurality of frame images based on the alignment reference, and causes a display to display the line segment so as to be superimposed on a representative frame image of the dynamic image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 7 is a diagram showing a display example of a graph of measurement results when a line segment on a superimposed image is designated by clicking or the like.

FIG. 8 is a diagram showing a display example of a superimposed image when a graph of measurement results is designated by clicking or the like.

DETAILED DESCRIPTION OF THE EMBODIMENTS

Hereinafter, embodiments of the invention will be described in detail with reference to the diagrams. However, the scope of the invention is not limited to those described in the following embodiments or diagrams.

Configuration of Radiography System 100

Figure 1:
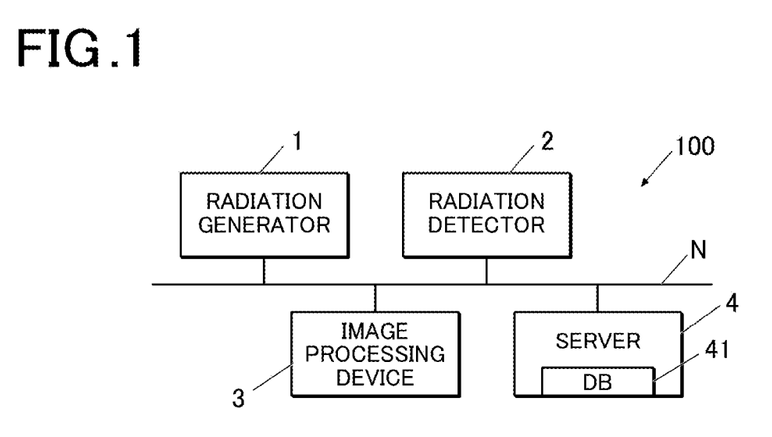
FIG. 1 is a diagram showing a configuration example of a radiography system according to an embodiment of the invention.

First, a schematic configuration of the radiography system 100 according to the present embodiment will be described. FIG. 1 is a block diagram showing the radiography system 100.

As shown in FIG. 1, the radiography system 100 of the present embodiment includes a radiation generator 1, a radiation detector 2, an image processing device 3, and a server 4. These can communicate with each other through a communication network N.

The radiography system 100 may be connectable to a hospital information system (HIS), a radiology information system (RIS), a picture archiving and communication system (PACS), and the like that are not shown.

Although not shown, the radiation generator 1 includes a generator that applies a voltage according to preset irradiation conditions (tube voltage, tube current, irradiation time (mAs value), and the like) based on the operation of an irradiation instruction switch, a radiation source that generates a dose of radiation (for example, X-rays) corresponding to the applied voltage when a voltage is applied from the generator, and the like.

The radiation generator 1 generates radiation in a manner corresponding to a radiographic image to be captured (dynamic image in the present embodiment).

The radiation generator 1 may be installed in the imaging room or may be made to be movable together with the image processing device 3 and the like, which is called a round-trip car.

Although not shown, the radiation detector 2 includes a substrate in which pixels each including a radiation detection element for generating an electric charge according to a dose upon receiving radiation and a switch element for storing and emitting an electric charge are arranged in a two-dimensional manner (in a matrix), a scanning circuit that switches ON/OFF of each switch element, a read circuit that reads the amount of electric charges emitted from each pixel as a signal value, a control unit that generates a radiographic image from a plurality of signal values read by the read circuit, an output unit that outputs data of the generated radiographic image to the outside, and the like.

The radiation detector 2 may generate a radiographic image corresponding to the emitted radiation in synchronization with the timing at which the radiation is emitted from the radiation generator 1.

The radiation detector 2 may have a built-in scintillator or the like, so that the emitted radiation is converted into light having another wavelength, such as visible light, by the scintillator and an electric charge corresponding to the converted light is generated (so-called indirect type) or may directly generate an electric charge from radiation without a scintillator or the like (so-called direct type).

The radiation detector 2 may be a dedicated machine type integrated with an imaging table or may be a portable type (cassette type).

The image processing device 3 is a personal computer (PC), a dedicated device, or the like.

The image processing device 3 may be a console that sets various imaging conditions (tube voltage, tube current, irradiation time (mAs value), frame rate, subject physique, presence or absence of grid, and the like) in the radiation generator 1, the radiation detector 2, or the like based on the imaging order information acquired from other systems (HIS, RIS, or the like) or the operation by the user.

Details of the image processing device 3 will be described later.

The server 4 is a PC, a dedicated device, a virtual server on the cloud, or the like.

The server 4 has a database (DB) 41.

The database 41 can store the radiographic image generated by the radiation detector 2 or the processing result of the image processing device 3.

In the present embodiment, the database 41 is provided in the server 4 independent of the image processing device 3 and the like. However, the database 41 may be provided in the image processing device 3 or may be provided in another device included in the radiography system 100.

When another system such as a PACS is connected to the radiography system 100, the database 41 may be provided in another system.

In the radiography system 100 according to the present embodiment configured as described above, the radiation source of the radiation generator 1 and the radiation detector 2 are arranged so as to face each other with a gap therebetween and the radiation from the radiation source is emitted to the subject arranged between the radiation source of the radiation generator 1 and the radiation detector 2, so that it is possible to take a radiographic image of the subject.

In the present embodiment, for each imaging operation, the emission of pulsed radiation from the radiation source and the generation of an image by the radiation detector 2 are repeated a plurality of times in a short time (for example, 15 times per second), thereby performing dynamic imaging for generating a plurality of radiographic images showing the movement of the subject. A series of radiographic images obtained by dynamic imaging is called a dynamic image. Each of the plurality of radiographic images configuring the dynamic image is called a frame image. In the dynamic imaging, radiation from the radiation source may be continuously emitted (continuous irradiation) at a low dose rate for a predetermined time without interruption, and a plurality of frame images may be generated by the radiation detector 2 during the period of time.

The dynamic imaging includes moving image capturing but does not include capturing a still image while displaying a moving image. The dynamic image includes a moving image but does not include an image obtained by capturing a still image while displaying a moving image.

Configuration of Image Processing Device 3

Figure 2:
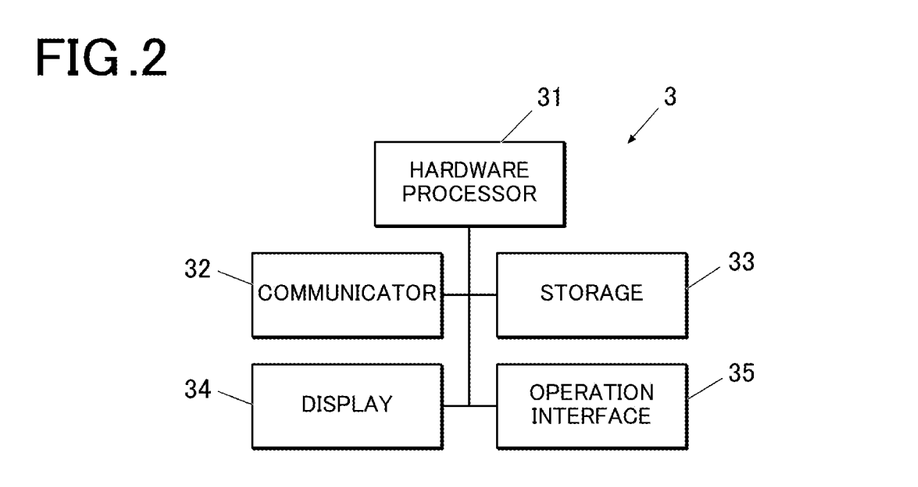
FIG. 2 is a block diagram showing an image processing device included in the radiography system shown in FIG. 1.

Next, a specific configuration of the image processing device 3 included in the radiography system 100 will be described. FIG. 2 is a block diagram showing the image processing device 3.

As shown in FIG. 2, the image processing device 3 according to the present embodiment includes a hardware processor 31, a communicator 32, a storage 33, a display 34, and an operation interface 35.

The respective units 31 to 35 are electrically connected to each other by a bus or the like.

The image processing device 3 may not include the display 34 or the operation interface 35, and a display device (tablet terminal or the like) including a display, or an operation interface may be connected to the image processing device 3.

The hardware processor 31 includes a central processing unit (CPU), a random access memory (RAM), and the like.

The CPU of the hardware processor 31 centrally controls the operation of each unit of the image processing device 3 by reading various programs stored in the storage 33, loading the programs to the RAM, and executing various processes according to the loaded programs. The hardware processor 31 functions as a designator, a setter, and a controller by executing various processes including a measurement process, which will be described later, in cooperation with the program stored in the storage 33.

The communicator 32 is a communication module or the like.

The communicator 32 transmits and receives various signals or various kinds of data to and from other devices (radiation detector 2 and the like) connected through the communication network N (a local area network (LAN), a wide area network (WAN), the Internet, and the like).

The storage 33 is a non-volatile semiconductor memory, a hard disk, or the like.

The storage 33 stores various programs executed by the hardware processor 31, parameters necessary for executing the programs, and the like.

The storage 33 may be capable of storing a radiographic image.

The display 34 is a liquid crystal display (LCD), a cathode ray tube (CRT), or the like.

The display 34 displays a radiographic image, a measurement result in the radiographic image, and the like based on the control signal input from the hardware processor 31. The display 34 functions as a display.

The operation interface 35 is configured to be operable by the user by a keyboard including cursor keys, number input keys, and various function keys, a pointing device such as a mouse, a touch panel laminated on the surface of the display device, and the like. The operation interface 35 outputs a control signal corresponding to the operation performed by the user to the hardware processor 31.

Figure 3:
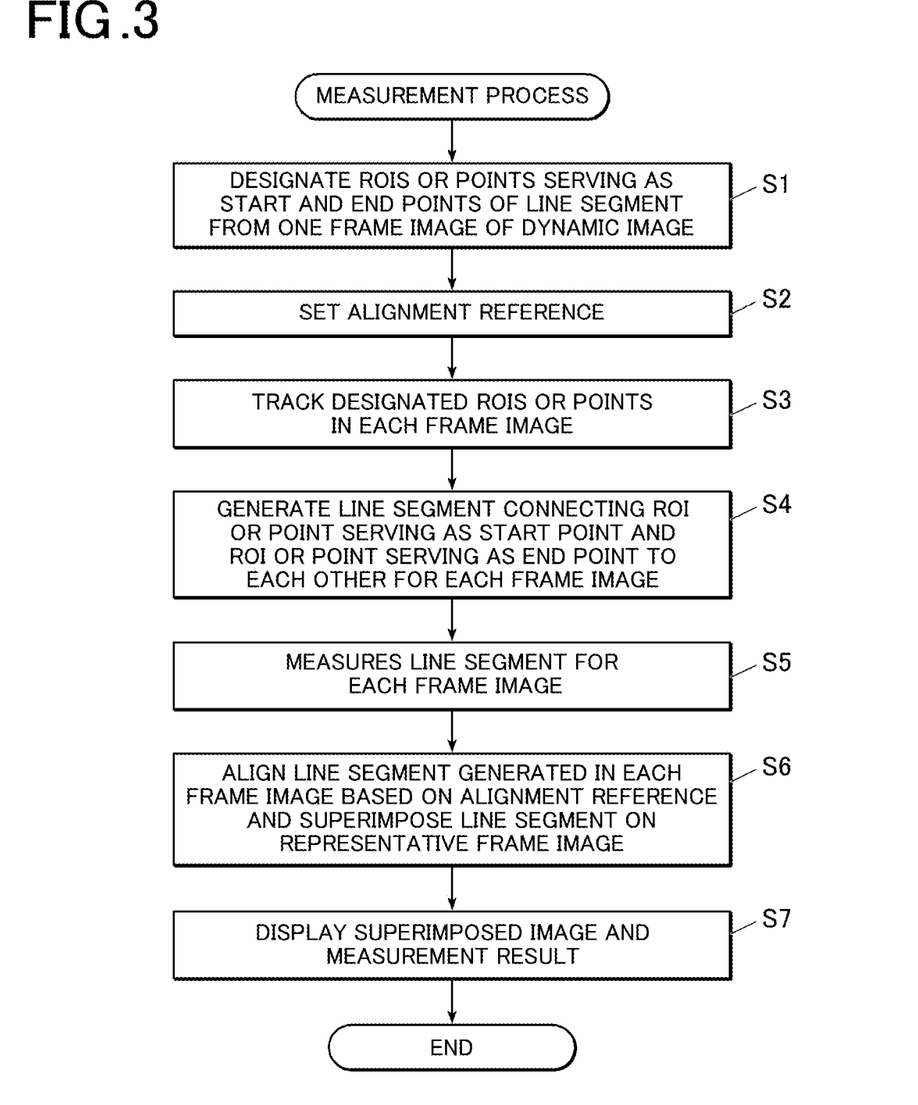
FIG. 3 is a flowchart showing a measurement process executed by a hardware processor shown in FIG. 2.

The hardware processor 31 of the image processing device 3 configured as described above has a function of executing a measurement process shown in FIG. 3, for example, when a predetermined start operation is performed.

Operation

Next, the operation of the radiography system 100 will be described.

First, dynamic imaging is performed on the subject by using the radiation generator 1 and the radiation detector 2, thereby acquiring a dynamic image including a plurality of frame images. In the present embodiment, for example, dynamic imaging is performed by using a locomotorium, such as a cervical spine, a lumbar spine, a limb bone, a knee joint, a hip joint, an elbow joint, a wrist joint, and an ankle joint, as a subject to acquire a dynamic image showing the movement of the locomotorium.

Each of the frame images of the dynamic image generated by the radiation detector 2 by the dynamic imaging includes information, such as an identification ID for identifying the dynamic image, patient information, and examination information (imaging part, irradiation conditions, image reading conditions, and a number indicating the imaging order (frame number)) (for example, the pieces of information are written in the header area of image data in the DICOM (digital image and communications in medicine) format), and the pieces of information are sequentially transmitted to the image processing device 3. The frame images of the dynamic images may be collectively transmitted to the image processing device 3.

The image processing device 3 executes the measurement process shown in FIG. 3 on the dynamic image transmitted from the radiation detector 2, and measures and outputs information regarding the movement, shape, and the like of the locomotorium. The measurement process is executed in cooperation between the hardware processor 31 and the program stored in the storage 33. Hereinafter, the measurement process will be described with reference to FIG. 3.

First, the hardware processor 31 receives the designation of a plurality of ROIs (regions of interest) or points for specifying the start and end points of the line segments drawn on structures (bones and the like) included in the locomotorium from one of a plurality of frame images of the received dynamic image (step S1).

For example, the hardware processor 31 causes the display 34 to display one frame image (for example, the first frame image) of the dynamic image, and receives the designation of a plurality of ROIs or points, which are the start and end points of the line segments drawn on the structures (bones and the like) included in the locomotorium, by the user's operation on the operation interface 35.

Then, the hardware processor 31 receives the selection of at least one ROI or point from the plurality of designated ROIs or points and sets the alignment reference (step S2).

For example, the hardware processor 31 receives the selection of at least one ROI or point from the plurality of ROIs or points designated in step S1 by the user's operation on the operation interface 35 and sets the alignment reference based on the selected ROI or point. For example, when one ROI or point is selected, the hardware processor 31 sets the selected ROI or point as an alignment reference. When two ROIs or points are selected, the hardware processor 31 sets the line segment connecting the two ROIs or points to each other as an alignment reference.

Then, the hardware processor 31 tracks each of the plurality of ROIs or points designated in step S1 in the plurality of frame images of the dynamic image (step S3).

ROI or point tracking can be performed by using a known technique, such as template matching, and the method is not particularly limited. When a point is designated, for example, template matching can be performed by using a small region having a predetermined size centered on the point as a template to track the small region, and the center of the tracked small region can be set as a tracked point.

Tracking may be performed on all frame images of the dynamic image or may be performed only on some of the frame images to be displayed when only some of the frame images are displayed.

The frame images to be tracked may be subjected to sharpening processing, smoothing processing, dynamic range compression processing, spatial filtering processing, and the like in advance. This makes it possible to accurately track the designated ROIs or points based on the structural features or texture features of the bone.

Then, the hardware processor 31 generates a line segment connecting the ROI or point serving as a start point and the ROI or point serving as an end point to each other for each frame image in which the tracking of the designated ROIs or points has been performed (step S4).

When the start point or the end point is designated in the ROI, a line segment is generated with a predetermined point of the ROI, for example, the center point of the ROI as the start point or the end point.

Then, the hardware processor 31 measures the generated line segment for each frame image in which tracking has been performed (step S5).

For example, when there is one line segment generated, the distance of the line segment is measured. When there is a plurality of line segments generated, at least one of the distance (length) of each line segment, the distance ratio between the plurality of line segments, and the angle formed by the plurality of (two) line segments is measured. The measurement target (distance, distance ratio, angle, and the like) may be set in advance or may be set by the user using the operation interface 35.

Figure 4:
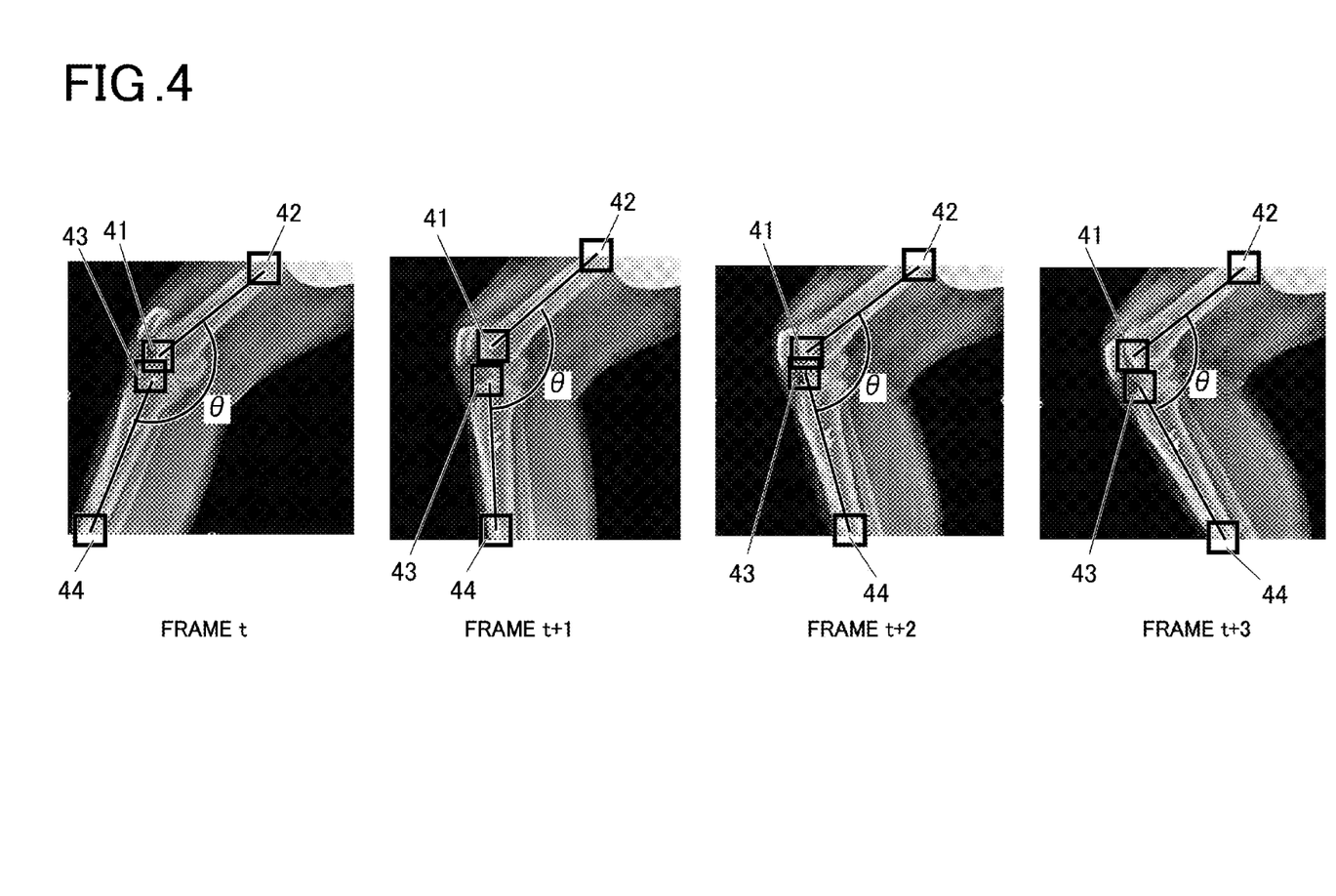
FIG. 4 is a diagram showing an example of a line segment and a measurement target (angle) generated in each frame image when processes of steps S1 to S5 in FIG. 3 are executed on a dynamic image obtained by imaging the bending and stretching movement of a knee joint.

FIG. 4 is a diagram showing the line segments and the measurement target (angle) generated in respective frame images when the processes of steps S1 to S5 are executed on frame images (frames t to t+3) of a dynamic image obtained by imaging the bending and stretching movement of the knee joint.

For example, if an ROI 41 and an ROI 42 on the femur are designated as start and end points and an ROI 43 and an ROI 44 on the tibia are designated as start and end points in step S1 of FIG. 3, a line segment connecting the ROI 41 and the ROI 42 on the femur to each other and a line segment connecting the ROI 43 and the ROI 44 on the tibia to each other are generated and an angle θ formed by the two line segments is measured in each frame image, as shown in FIG. 4. For example, by designating an ROI at each of the end of the bone axis of the femur on the knee side and the end of the bone axis of the femur on the pelvic side and designating an ROI at each of the end of the bone axis of the tibia on the knee side and the end of the bone axis of the tibia on the ankle side, the bone axis of the femur and the bone axis of the tibia can be drawn in each frame image, and the angle between the two bone axes in each frame image can be measured.

Then, the hardware processor 31 aligns the line segments generated in the respective frame images based on the set alignment reference and superimposes the line segments on the representative frame image to generate a superimposed image (step S6). Then, the hardware processor 31 causes the display 34 to display the superimposed image in which the line segments generated in the respective frame images are superimposed and the measurement result of the measurement performed in step S5 (step S7) and ends the measurement process.

Figure 5:
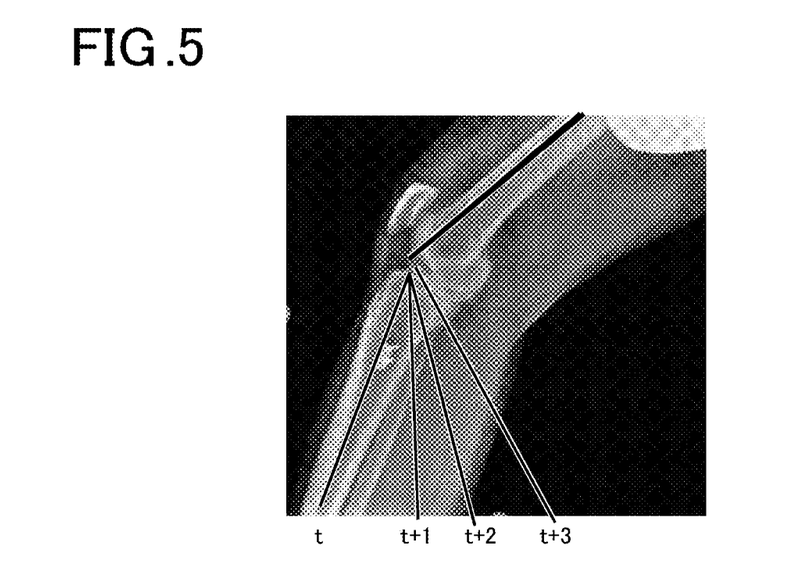
FIG. 5 is a diagram showing an example of a superimposed image obtained by aligning the line segments of respective frame images shown in FIG. 4 with an ROI on the knee side of the femur as an alignment reference and superimposing the line segments on a representative frame image.

FIG. 5 is a diagram showing an example of a superimposed image obtained by aligning the line segments of the respective frame images shown in FIG. 4 with the ROI 41 on the knee side of the femur as an alignment reference and superimposing the line segments on the representative frame image. As shown in FIG. 5, the line segments generated on the femur and the tibia, which are structures around the knee joint, in the respective frame images are aligned with the ROI 41 on the knee side of the femur as a reference and displayed in a list in the representative frame image. Therefore, since it is possible to visualize the movements of the femur and the tibia between the frame images, the user can accurately grasp the movements of the femur and the tibia between the frame images. In addition, it is possible to accurately measure the length (distance) of each bone or the ratio (distance ratio), the angle formed by the line segments of two bones, and the like in each frame image.

Assuming that the line segment is an alignment reference, alignment using rotation can be performed based on the representative frame image.

One frame image among the frame images in which the line segments are generated may be used as a representative frame image, or a plurality of frame images may be used as representative frame images. When a plurality of frame images is used as representative frame images, for each of the representative frame images, line segments generated in the respective frame images are aligned based on the alignment reference in the representative frame image and superimposed on each representative frame image, as in a case where one frame image is used as a representative frame image.

As a method of displaying the measurement result, for example, the measured values such as the distance, the distance ratio, and the angle measured in each frame image may be displayed in the form of a table or may be displayed so as to be associated with the line segments and the like on the superimposed image. Alternatively, a graph of the measurement result may be displayed. That is, the measured values measured in each frame image may be plotted on a coordinate space in which the vertical axis indicates the measured value, and the horizontal axis indicates the time (frame number) and displayed as a graph.

The hardware processor 31 may analyze the amount of change in the measured value between the frame images based on the graph of the measurement result and determine whether or not there is a change point (for example, a timing when the slope of the graph changes) of the movement of the locomotorium (structure) or an abnormal section (for example, a section in which the absolute value of the slope of the graph exceeds a predetermined threshold value). When it is determined that there is an abnormal section, a line segment corresponding to the frame image of the section determined to be abnormal, among the line segments on the superimposed image, may be highlighted.

Figure 6:
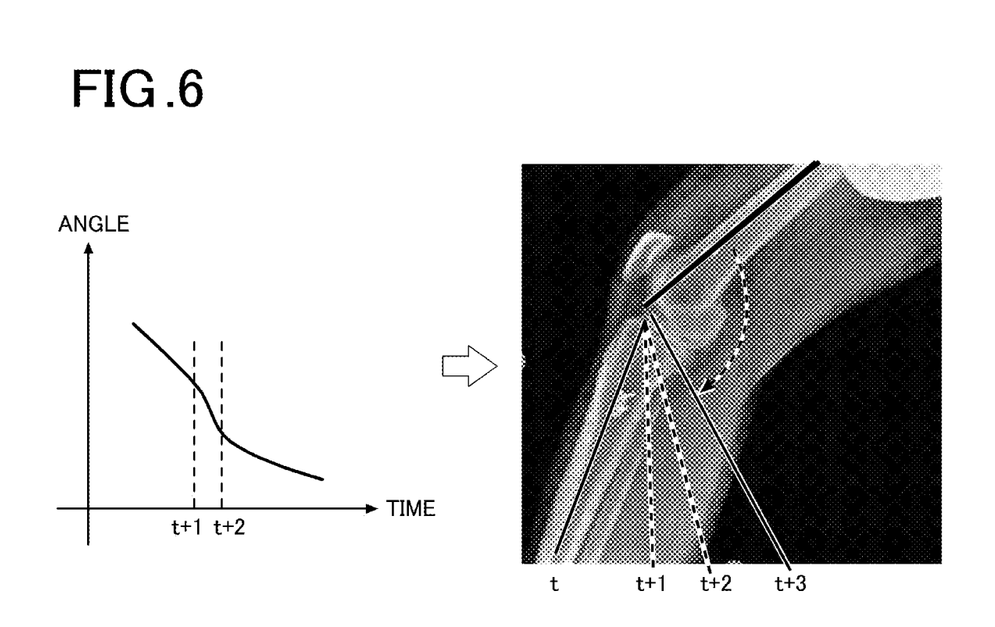
FIG. 6 is a diagram showing an example of the display of a superimposed image when it is determined that there is an abnormality in a section of t+1 to t+2 in a graph of measurement results.

FIG. 6 is a diagram showing an example of the display of a superimposed image when it is determined that there is an abnormality in a section of t+1 to t+2. As shown in FIG. 6, a line segment corresponding to t+1 and t+2 on the superimposed image is highlighted in a manner different from other line segments (for example, in a different color or different line type). Therefore, the user can accurately grasp whether or not there is an abnormality in the movement of the structure contained in the locomotorium, and if there is an abnormality, it is possible to accurately grasp in which section (between frame images) there is the abnormality.

Figure 7:
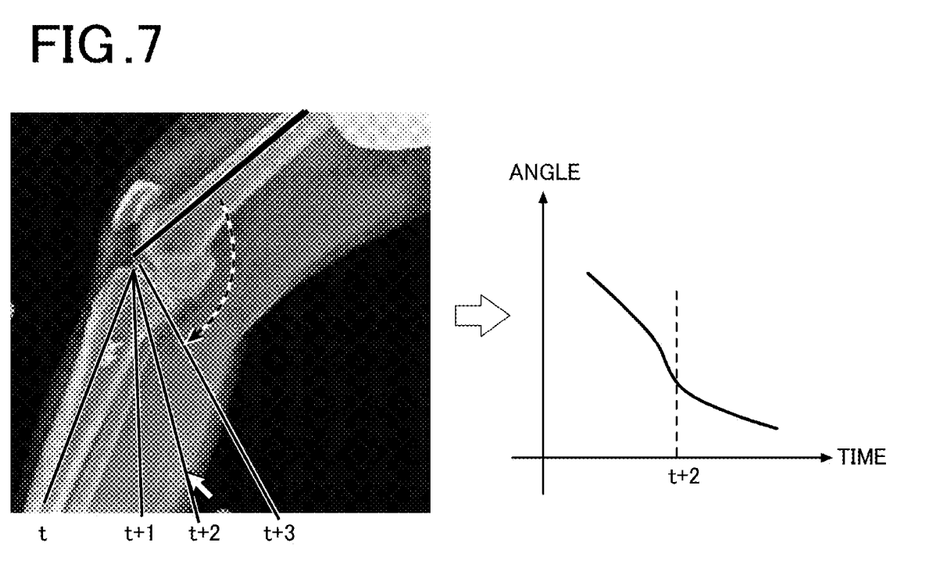
Figure 8:
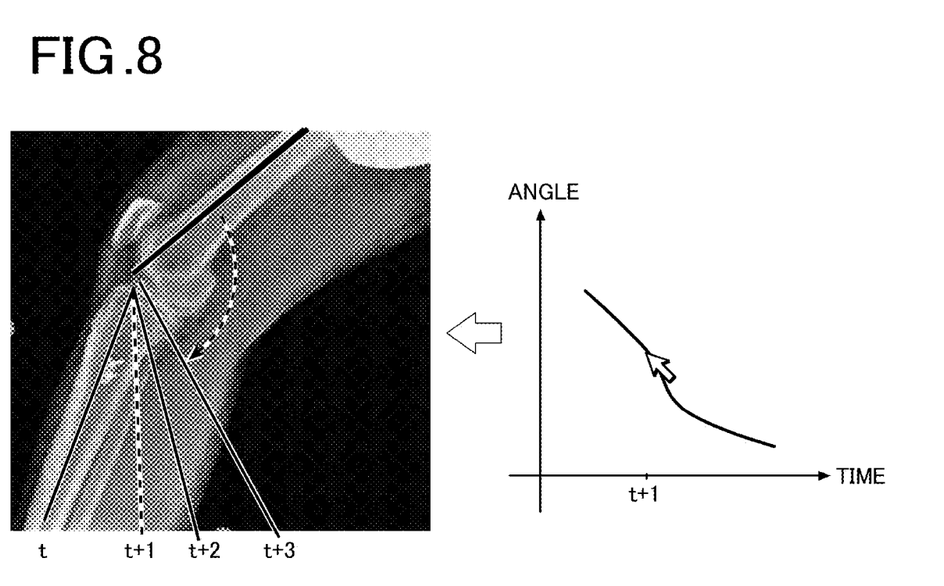

As shown in FIG. 7, when a line segment on the superimposed image is designated by clicking of the operation interface 35 or the like, the hardware processor 31 may highlight the corresponding portion (the position of the frame image corresponding to the designated line segment) on the graph. As shown in FIG. 8, when a graph is designated by clicking of the operation interface 35 or the like, the line segment on the superimposed image corresponding to the designated position may be highlighted. Therefore, the user can easily and accurately recognize the relationship between the graph and the line segment on the superimposed image. In addition, the user can easily check the movement in the abnormal section on the image.

First Modification Example

Next, a first modification example of the above embodiment will be described.

In the above embodiment, when the ROI is designated as the start point or the end point of the line segment, the center point of the ROI is set as the start point or the end point when the line segment is generated. However, in a first modification example, an example will be described in which, when the ROI is designated on the joint including two bones (a first bone and a second bone), the contact point of the joint (contact point between the first bone side and the second bone side) in the ROI is set as the start point of the line segment and the alignment reference.

For example, when the ROI on the joint is included in the plurality of ROIs designated in step S1 of the measurement process of the embodiment described above, the hardware processor 31 tracks the ROI on the joint in the plurality of frame images and automatically recognizes the contact point of the joint (contact point between the first bone side and the second bone side) from the inside of the ROI tracked in each of the plurality of frame images in step S2. For example, the inside of the ROI is emphasized at the edge to recognize the contact point of the joint. When the joint on the first bone side and the joint on the second bone side are in contact with each other on a surface, the center of the contact surface is recognized as a contact point. Then, the recognized contact point is set as an alignment reference. When generating a line segment in a plurality of frame images in step S4, the line segment is generated by connecting the recognized contact point to another ROI or point with the recognized contact point as the start point of the line segment. When superimposing the line segment generated in each frame image on the representative frame image in step S6, the contact point of the joint is aligned as an alignment reference to superimpose the line segment on the representative frame image.

In this manner, by automatically recognizing the contact point of the joint serving as a fulcrum during exercise from each frame image and aligning the line segment generated in each frame image based on the recognized contact point to superimpose the line segment on the representative frame image, it is possible to more accurately capture and visualize the movement during exercise.

Figure 9:
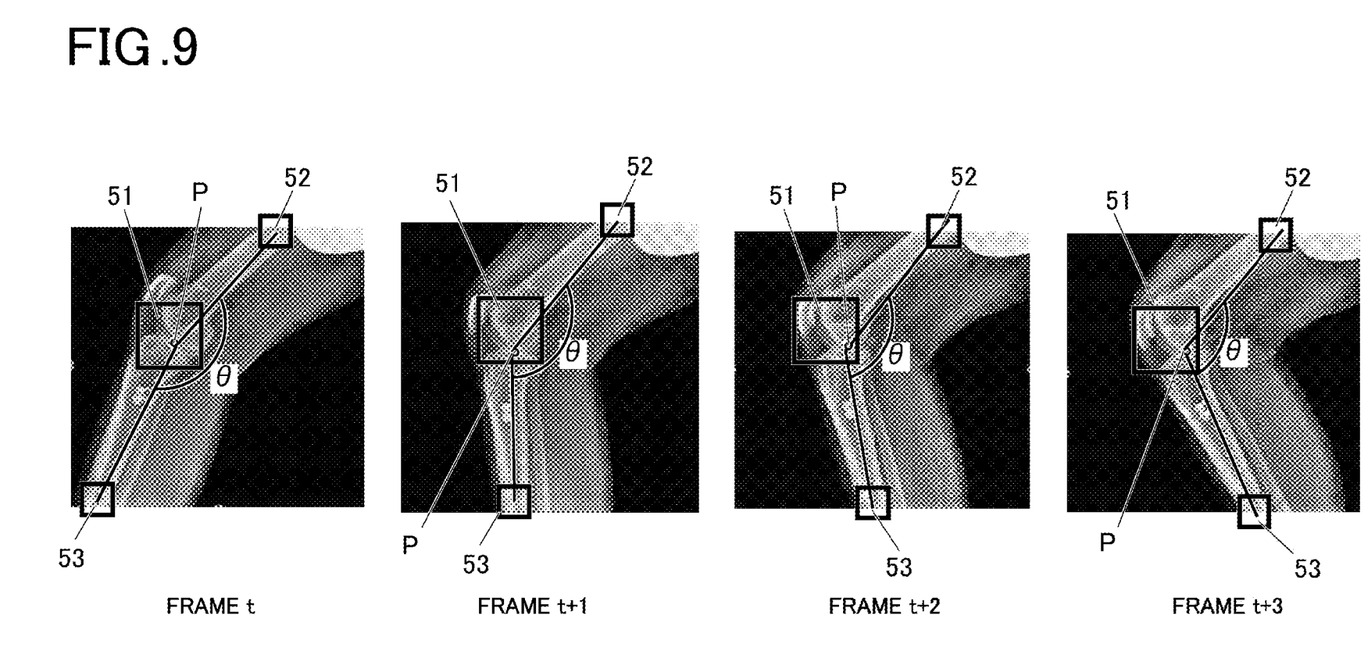
FIG. 9 is a diagram showing an example of a line segment and a measurement target (angle) generated with the contact point of a joint in an ROI designated on the joint in each frame image of a dynamic image, which is obtained by imaging the bending and stretching movement of a knee joint, as a start point.

FIG. 9 is a diagram showing the line segments and the measurement target (angle) generated in respective frame images when the processes of steps S2 to S5 are executed on frame images (frames t to t+3) of a dynamic image, which is obtained by imaging the bending and stretching movement of the knee joint, by designating an ROI 51 on the joint, an ROI 52 at the end of the femur on the pelvic side, and an ROI 53 at the end of the tibia on the ankle side.

As shown in FIG. 9, in each frame image, a line segment connecting the ROI 52 and the contact point P of the joint recognized in the ROI 51 to each other and a line segment connecting the contact point P and the ROI 53 to each other are generated and, for example, the angle θ formed by the two line segment is measured. Due to the bending and stretching movement of the knee joint, the position of the contact point P of the joint moves within the ROI 51. However, by reflecting this in the first modification example, it can be seen that the position of the contact point P changes within the ROI 51 in each frame image.

Figure 10:
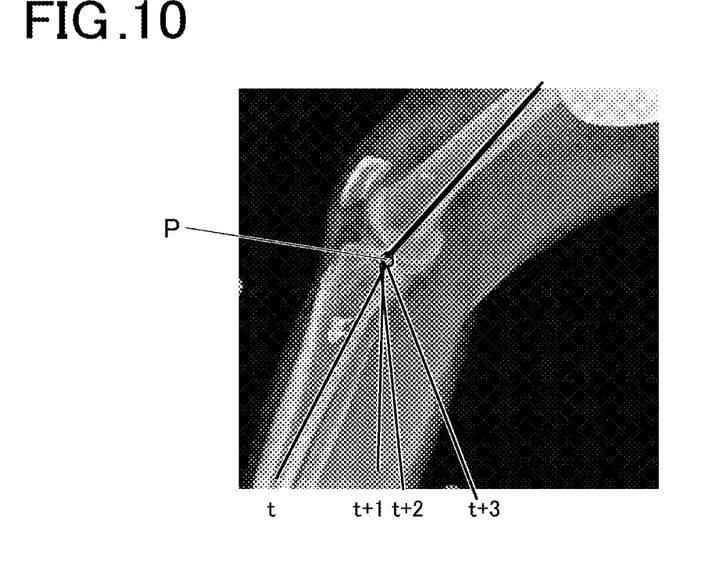
FIG. 10 is a diagram showing an example of a superimposed image obtained by aligning the line segments of respective frame images shown in FIG. 9 with the contact point of a joint as an alignment reference and superimposing the line segments on a representative frame image.

FIG. 10 is a diagram showing an example of a superimposed image obtained by aligning the line segments generated in the respective frame images shown in FIG. 9 with the contact point P in the ROI 51 as an alignment reference and superimposing the line segments on the representative frame image. As shown in FIG. 10, the line segments generated on the femur and the tibia in the respective frame images are aligned with the contact point P serving as a fulcrum during the bending and stretching movement as a reference and displayed in a list on the representative frame image. Therefore, since it is possible to visualize the movement of the femur or the tibia between the frame images with the contact point P serving as a fulcrum during the bending and stretching movement as a reference, the user can accurately grasp the movements of the femur and the tibia between the frame images with the contact point P serving as a fulcrum during the bending and stretching movement as a reference. In addition, it is possible to accurately measure the angle between the femur and the tibia in each frame image.

In step S2 of the measurement process described above, the ROI on the joint and another ROI or point may be made to be selectable as an alignment reference, and the hardware processor 31 may set the line segment connecting the contact point recognized from the selected joint and another ROI or point to each other as a reference for alignment.

Second Modification Example

In the first modification example, the line segments that are generated in the respective frame images and connect the contact point of the joint in the ROI designated on the joint and another ROI or point to each other are aligned based on the contact point of the joint and displayed so as to be superimposed on the representative frame image. However, it is also possible to obtain the bone axes from the respective frame images, align the bone axes based on the contact point of the joint described above, and display the bone axes so as to be superimposed on the representative frame image. In addition, the distance, the distance ratio, the angle, and the like may be measured from the bone axes obtained in the respective frame images.

Figure 11:
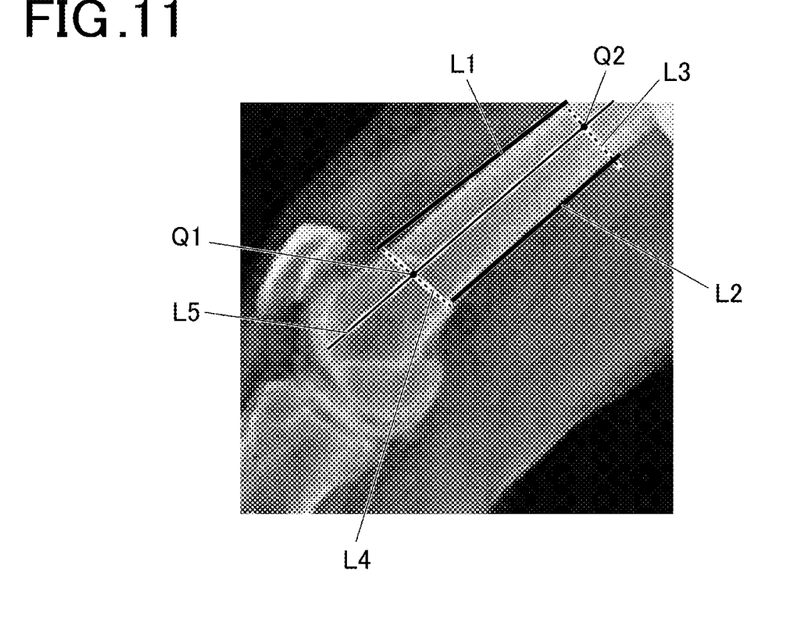
FIG. 11 is a diagram for explaining a method of extracting a bone axis.

As shown in FIG. 11, the bone axis can be generated by detecting linear components L1 and L2 of the bone from each frame image by edge processing first, generating lines L3 and L4 connecting the ends of the detected line segments L1 and L2 to each other, and connecting midpoints Q1 and Q2 of the lines L3 and L4 to each other (L5 in FIG. 11).

Figure 12:
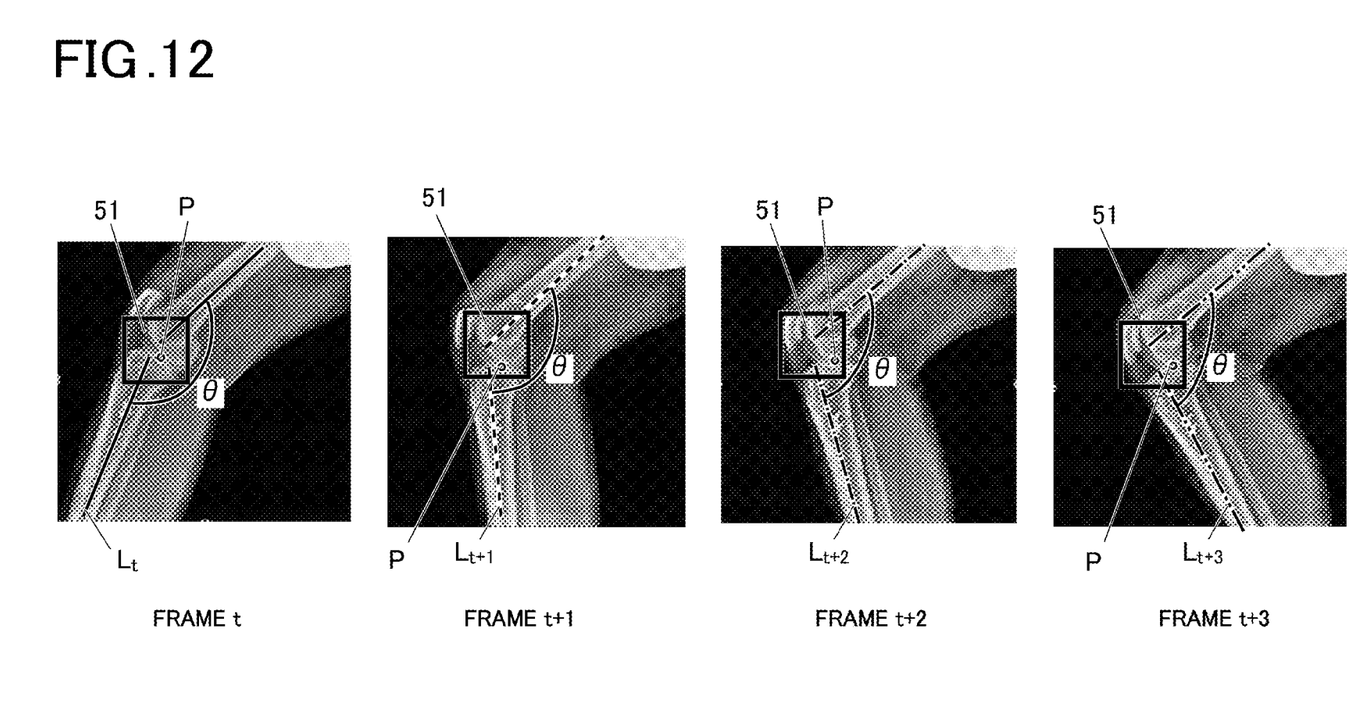
FIG. 12 is a diagram showing an example of a contact point of a joint, a bone axis, and a measurement target (angle) recognized from each frame image of a dynamic image obtained by imaging the bending and stretching movement of a knee joint.

FIG. 12 is a diagram showing the ROI 51 designated on the joint, the contact point P of the joint recognized in the ROI 51, and bone axes Lt to Lt+3 generated in respective frame images, in a plurality of frame images (frames t to t+3)

of a dynamic image obtained by imaging the bending and stretching movement of the knee joint.

Figure 13:
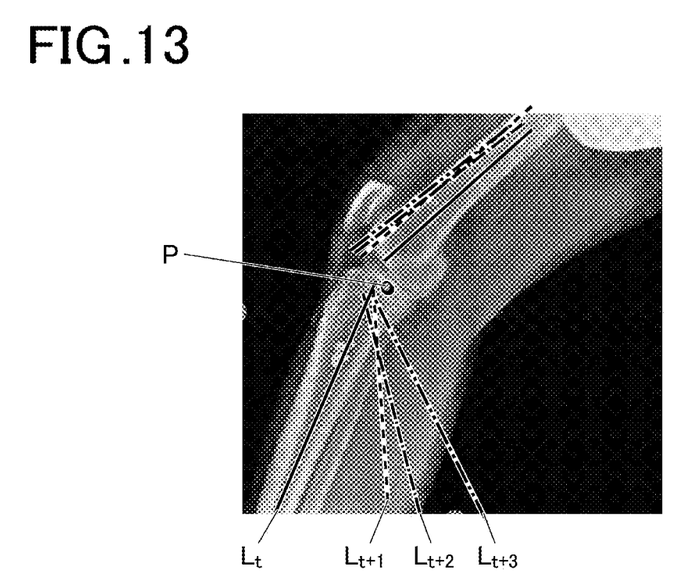
FIG. 13 is a diagram showing an example of a superimposed image obtained by aligning the bone axes of respective frame images shown in FIG. 12 with the contact point of a joint as an alignment reference and superimposing the bone axes on a representative frame image.

FIG. 13 is a diagram showing an example of a superimposed image obtained by aligning the bone axes Lt to Lt+3 generated in the respective frame images shown in FIG. 12 with the contact point P in the ROI 51 as an alignment reference and superimposing the bone axes Lt to Lt+3 on the representative frame image. As shown in FIG. 13, the bone axes of the femur and the tibia in the respective frame images are aligned with the contact point P serving as a fulcrum during the bending and stretching movement as a reference and displayed in a list on the representative frame image. Therefore, since it is possible to visualize the movement of the bone axis of the femur or the tibia between the frame images with the contact point P serving as a fulcrum during the bending and stretching movement as a reference, the user can accurately grasp the movements of the bone axes of the femur and the tibia between the frame images with the contact point P serving as a fulcrum during the bending and stretching movement as a reference. In addition, it is possible to accurately measure the angle and the like between the bone axes of the femur and the tibia in each frame image.

As described above, the hardware processor 31 of the image processing device 3 receives the designation of a plurality of ROIs or points from one frame image of the dynamic image acquired by dynamic imaging of the movement of the locomotorium and sets the alignment reference based on the designated ROIs or points. Then, the hardware processor 31 tracks the designated ROIs or points in a plurality of frame images of the dynamic image, aligns line segments connecting the ROIs or points in the plurality of frame images based on the alignment reference, and causes the display 34 to display the line segments so as to be superimposed on the representative frame image of the dynamic image.

Therefore, since the line segments connecting the ROIs or points designated on the structure, which are generated in the respective frame images, are aligned based on the set alignment reference and displayed in a list in the representative frame image, it is possible to visualize the movement of the structure between the frame images. As a result, the user can accurately grasp the movement of the structure between the frame images. In addition, since the user can designate the ROI or point serving as the start point or the end point of the line segment drawn on the representative frame image, it is possible to visualize the movement of the line segment between the two points on the structure desired by the user.

In addition, the hardware processor 31 measures at least one of the distances of the generated line segment, the angle formed by the plurality of line segments, and the distance ratio of the plurality of line segments from each of the plurality of frame images of the dynamic image and causes the display 34 to display the measurement result. Therefore, it is possible to accurately measure the length (distance) of the line segment on the structure, the ratio (distance ratio) of the plurality of line segments, the angle of the plurality of line segments, and the like in each frame image. In addition, since the user can designate the ROI or point serving as the start point or the end point of the line segment drawn on the representative frame image, measurement can be performed for the line segment to be measured by the user.

In addition, since the hardware processor 31 arranges the measurement results in time series and causes the display 34 to display the measurement results as a graph, the user can easily grasp the time change of the measurement results.

In addition, the hardware processor 31 analyzes the measurement results in the plurality of frame images to determine whether or not there is a section, in which the movement of the structure is abnormal, in the plurality of frame images. When it is determined that there is a section with an abnormality, the hardware processor 31 highlights the line segment corresponding to the frame image of the section determined to have an abnormality on the superimposed image.

Therefore, the user can easily and accurately recognize the relationship between the graph and the line segment on the superimposed image. In addition, the user can easily check the movement in the abnormal section on the image.

When an ROI is designated on the joint, the hardware processor 31 tracks the ROI designated on the joint in a plurality of frame images, recognizes the contact point of the joint from the inside of the region tracked in each of the plurality of frame images, and sets the recognized contact point as an alignment reference.

Therefore, since the line segments generated in the respective frame images are aligned with the contact point of the joint serving as a fulcrum during movement as a reference and displayed in a list on one image, the user can accurately grasp the changes between the frame images of the movement of the structure when the contact point serving as a fulcrum during movement is set as a reference.

The description in the above embodiment and its modification examples is a preferable example of the invention, and the invention is not limited thereto.

For example, in the above embodiment, it has been described that the hardware processor 31 performs the above measurement processing by using the display 34 or the operation interface 35 provided in the image processing device 3, receives the designation of ROIs or points, and displays a superimposed image and a graph. However, the hardware processor 31 may perform the above measurement processing by using a display or an operation interface of an external terminal device (tablet terminal or the like) connected to the image processing device 3, receive the designation of ROIs or points, and display a superimposed image and a graph.

For example, in the above description, an example is disclosed in which a hard disk, a semiconductor non-volatile memory, or the like is used as a computer-readable medium for a program according to the invention, but the invention is not limited to this example. As other computer-readable media, a portable recording medium, such as a CD-ROM, can be applied. A carrier wave is also applied as a medium for providing data of the program according to the invention through a communication line.

The detailed configuration and detailed operation of each device included in the radiography system can also be appropriately changed without departing from the spirit of the invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing device, comprising:
a hardware processor,
wherein the hardware processor designates, from one frame image of a dynamic image acquired by dynamic imaging of a movement of a locomotorium, a plurality of regions or points on a structure included in the locomotorium, sets an alignment reference based on the designated regions or points, tracks the designated regions or points in a plurality of frame images of the dynamic image, aligns a line segment connecting the regions or the points to each other in the plurality of frame images based on the alignment reference, and causes a display to display the line segment so as to be superimposed on a representative frame image of the dynamic image;

wherein, when a region is designated on a joint, the hardware processor tracks the region designated on the joint in the plurality of frame images, recognizes a contact point of the joint from an inside of the region tracked in each of the plurality of frame images, and sets the recognized contact point as the alignment reference.

2. The image processing device according to claim 1, wherein the hardware processor measures at least one of a distance of the line segment, an angle formed by a plurality of line segments, and a distance ratio of the plurality of line segments from each of the plurality of frame images and causes the display to display measurement results.

3. The image processing device according to claim 2, wherein the hardware processor arranges the measurement results in time series and causes the display to display the measurement results as a graph.

4. The image processing device according to claim 2, wherein the hardware processor analyzes the measurement results in the plurality of frame images to determine whether or not there is a section, in which a movement of the structure is abnormal, in the plurality of frame images, and when it is determined that there is a section with an abnormality, the hardware processor highlights a line segment corresponding to a frame image of the section determined to have an abnormality superimposed on the representative frame image.

5. A display control method, comprising:
designating, from one frame image of a dynamic image acquired by dynamic imaging of a movement of a locomotorium, a plurality of regions or points on a structure included in the locomotorium;
setting an alignment reference based on the designated regions or points; and
tracking the designated regions or points in a plurality of frame images of the dynamic image, aligning a line segment connecting the regions or the points to each other in the plurality of frame images based on the alignment reference, and causing a display to display the line segment so as to be superimposed on a representative frame image of the dynamic image;
wherein, when a region is designated on a joint:
the region designated on the joint is tracked in the plurality of frame images,
a contact point of the joint from an inside of the region tracked is recognized in each of the plurality of frame images, and
the recognized contact point is set as the alignment reference.

6. A non-transitory recording medium storing a computer readable program causing a computer to function as:
a designator that designates, from one frame image of a dynamic image acquired by dynamic imaging of a movement of a locomotorium, a plurality of regions or points on a structure included in the locomotorium;
a setter that sets an alignment reference based on the designated regions or points; and
a controller that tracks the designated regions or points in a plurality of frame images of the dynamic image, aligns a line segment connecting the regions or the points to each other in the plurality of frame images based on the alignment reference, and causes a display to display the line segment so as to be superimposed on a representative frame image of the dynamic image;
wherein, when a region is designated on a joint:
the region designated on the joint is tracked in the plurality of frame images,
a contact point of the joint from an inside of the region tracked is recognized in each of the plurality of frame images, and
the recognized contact point is set as the alignment reference.

* * * * *